United States Patent  (10) Patent No.: US 8,320,771 B2
Yoshida et al.  (45) Date of Patent: Nov. 27, 2012

(54) OPTICAL TRANSMISSION SYSTEM AND REPEATER

(75) Inventors: Tsuyoshi Yoshida, Tokyo (JP); Toshiyuki Tokura, Tokyo (JP); Takashi Sugihara, Tokyo (JP); Katsuhiro Shimizu, Tokyo (JP); Aritomo Uemura, Tokyo (JP); Hiroki Shima, Tokyo (JP); Kiyoshi Onohara, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 259 days.

(21) Appl. No.: 12/812,367

(22) PCT Filed: Jan. 22, 2008

(86) PCT No.: PCT/JP2008/050785
§ 371 (c)(1),
(2), (4) Date: Jul. 9, 2010

(87) PCT Pub. No.: WO2009/093304
PCT Pub. Date: Jul. 30, 2009

(65) Prior Publication Data
US 2010/0284694 A1 Nov. 11, 2010

(51) Int. Cl.
*H04B 10/00* (2006.01)
(52) U.S. Cl. ....................................... 398/173
(58) Field of Classification Search .................. 398/173
See application file for complete search history.

(56) References Cited

U.S. PATENT DOCUMENTS

| 2002/0060837 | A1* | 5/2002 | Inagaki et al. ................ 359/337 |
| 2003/0035171 | A1* | 2/2003 | Touma ........................... 359/124 |
| 2007/0109630 | A1* | 5/2007 | Komaki et al. ............ 359/341.44 |

FOREIGN PATENT DOCUMENTS

| GB | 2324667 A | * 10/1998 |
| JP | 10 303821 | 11/1998 |
| JP | 10303821 A | * 11/1998 |
| JP | 2004 112312 | 4/2004 |
| JP | 2004112312 A | * 4/2004 |
| JP | 2004 320483 | 11/2004 |
| JP | 2004320483 A | * 11/2004 |
| JP | 2006 202844 | 8/2006 |
| WO | 01 80466 | 10/2001 |

* cited by examiner

*Primary Examiner* — Kenneth N Vanderpuye
*Assistant Examiner* — Abbas H Alagheband
(74) *Attorney, Agent, or Firm* — Oblon, Spivak, McClelland, Maier & Neustadt, L.L.P.

(57) ABSTRACT

A repeater includes a variable optical attenuating unit that collectively attenuates WDM optical signal input, an optical-attenuation adjusting unit that adjusts attenuation in the variable optical attenuating unit, and an optical amplifying unit that collectively amplifies and outputs the WDM optical signal collectively attenuated, to a downstream side. An optical-attenuation adjusting unit includes an input level detector; an output level detector; an output-level transmitting unit that receives information of a signal level of WDM optical signal output by a repeater at an upstream side and transmits information of a signal level of the WDM optical signal detected by the output level detector to a repeater at a downstream side; and an attenuation amount controller that controls the variable optical attenuating unit by calculating an attenuation amount thereof based on information of a signal level detected by the input level detector and a signal level received by the output-level transmitting unit.

10 Claims, 4 Drawing Sheets

OPTICAL TRANSMISSION SYSTEM AND REPEATER

TECHNICAL FIELD

The present invention relates to an optical transmission system and a repeater.

BACKGROUND ART

Conventionally, wavelength multiplexing is generally used in an optical transmission system. Wavelength multiplexing is also known as wavelength division multiplexing (WDM), and is an optical transmission technique of multiplex-transmitting plural optical signals of different wavelengths through one optical fiber. When an optical signal is transmitted over a long distance through an optical fiber in a wavelength-division-multiplexing optical transmission system, a loss is generated in a transmission path. Therefore, the optical signal needs to be amplified by installing a repeater between a transmission end and a receiving end. In addition, an optical amplifier is used in the repeater in the wavelength-division-multiplexing optical transmission system to compensate for the loss in the transmission path.

Because the power of transmitted optical signal gives negative influence on a transmission characteristic when the power is too large or too small, each repeater needs to amplify an input optical signal to have appropriate power, and to output the amplified optical signal. Generally, when amplifying a WDM optical signal, an amplification gain is controlled such that the total power of the WDM optical signal becomes at a constant level.

In this case, when the number of wavelengths in wavelength division multiplexing changes, power per one wavelength changes, and negative influence is generated in a transmission characteristic. Therefore, the amplification gain needs to be controlled according to the number of wavelength division multiplexing such that the power per one wavelength becomes constant. As a technique of amplifying the WDM optical signal, there has been proposed a technique of obtaining wavelength number information by counting the number of wavelengths within each repeater (see, for example, Patent Document 1).

According to such a conventional method, transmission and reception of the wavelength number information are not performed between repeaters. Thus, this method has characteristics such that there will be no reception of erroneous wavelength-number information due to noise or wavelength distortion, and the amplification gain can be changed on a real time basis.

Patent Document 1: Japanese Patent Application Laid-open No. H10-303821

DISCLOSURE OF INVENTION

Problem to be Solved by the Invention

According to the conventional method described above, it is necessary to provide a device to count the number of wavelengths in the repeater. This causes a problem in that the device hinders downsizing of a repeater that forms an optical transmission system, as well as high reliability, cost reduction, and power consumption reduction of the system.

The present invention has been achieved in view of the above problems, and an object of the present invention is to obtain an optical transmission system and a repeater by which power per one wavelength of WDM optical signal can be set at a predetermined value without counting the number of wavelengths.

Means for Solving Problem

An optical transmission system according to an aspect of the present invention includes a transmitter that transmits a wavelength-division-multiplexed optical signal having a plurality of optical signals of different wavelengths multiplexed at an upstream side of an optical transmission direction; a transmitting unit that transmits the wavelength-division-multiplexed optical signal transmitted by the transmitter; a plurality of repeaters that amplifies the wavelength-division-multiplexed optical signal transmitted by the transmitting unit; and a receiver that receives the wavelength-division-multiplexed optical signal transmitted by the transmitting unit via the repeaters at a downstream side of the optical transmission direction, wherein each of the repeaters includes: a variable optical attenuating unit that collectively attenuates the wavelength-division-multiplexed optical signal input to the own repeater from an upstream side; an optical-attenuation adjusting unit that adjusts attenuation of a signal level of the wavelength-division-multiplexed optical signal in the variable optical attenuating unit; and an optical amplifying unit that collectively amplifies the wavelength-division-multiplexed optical signal collectively attenuated by the variable optical attenuating unit, at a predetermined amplification gain, and outputs to a downstream side the wavelength-division-multiplexed optical signal collectively amplified, and the optical-attenuation adjusting unit comprises: an input level detector that detects a signal level of the wavelength-division-multiplexed optical signal input to the own repeater from an upstream side; an output level detector that detects a signal level of the wavelength-division-multiplexed optical signal, which is amplified by the optical amplifying unit and output to a downstream side from the own repeater; an output-level transmitting unit that receives information of a signal level of the wavelength-division-multiplexed optical signal, which is output by a repeater adjacent at an upstream side, and transmits information of a signal level of the wavelength-division-multiplexed optical signal detected by the output level detector to a repeater adjacent at a downstream side; and an attenuation amount controller that controls the variable optical attenuating unit by calculating an attenuation amount of a signal level of the wavelength-division-multiplexed optical signal in the variable optical attenuating unit based on information of a signal level of the wavelength-division-multiplexed optical signal detected by the input level detector and a signal level of the wavelength-division-multiplexed optical signal received by the output-level transmitting unit.

Effect of the Invention

According to the present invention, power per one wavelength of the WDM optical signal can be set at a predetermined value without counting the number of wavelengths, by controlling a signal level of the WDM optical signal with a variable optical attenuating unit such that a ratio of an output level of WDM optical signal at an upstream repeater to an input level of WDM optical signal to an optical-attenuation adjusting unit in a downstream repeater becomes constant.

EXPLANATIONS OF LETTERS OR NUMERALS

1 WDM optical signal transmitter
2 Optical transmission path
3 Repeater
4 WDM optical signal receiver
201 Transmission-path optical fiber
301-A, 301-B Variable optical attenuator (VOA)
302-A, 302-B Input-level-detection optical coupler
303-A, 303-B Optical amplifier
304-A, 304-B Output-level-detection optical coupler
305-A, 305-B Input-level-detection photon detector (PD)
306-A, 306-B Attenuation amount controller
307-A, 307-B Wavelength demultiplexing unit
308-A, 308-B Optical supervisory channel (OSC) receiving unit
309-A, 309-B Output-level-detection photon detector (PD)
310-A, 310-B OSC transmitting unit
311-A, 311-B OSC-transmission optical multiplexing unit
321-A, 321-B Gain-modulation-detection optical coupler
322-A, 322-B Gain-modulation receiving unit
323-A, 323-B Optical-amplifier-gain modulating unit
331-A, 331-B Level-information receiving unit
332-A, 332-B Level-information transmitting unit
333 Public line

BEST MODE(S) FOR CARRYING OUT THE INVENTION

Exemplary embodiments of an optical transmission system and a repeater according to the present invention will be explained below in detail with reference to the accompanying drawings. The present invention is not limited to the following descriptions, and modifications can be appropriately made within the scope of the present invention.

First Embodiment

Figure 1:
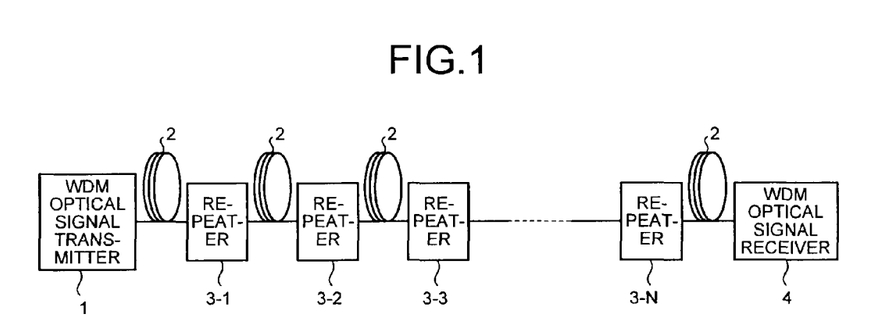
FIG. 1 depicts a configuration of an optical transmission system according to a first embodiment of the present invention.

FIG. 1 depicts a configuration of an optical transmission system according to a first embodiment of the present invention. As shown in FIG. 1, the optical transmission system according to the first embodiment is configured to include a WDM-signal optical transmitter 1, optical transmission paths 2, repeaters 3, and a WDM-signal optical receiver 4. As repeaters 3, N repeaters including a repeater 3-1, a repeater 3-2, a repeater 3-3, . . . , and a repeater 3-N (N is a positive integer) are provided between the WDM-signal optical transmitter 1 and the WDM-signal optical receiver 4.

Figure 2:
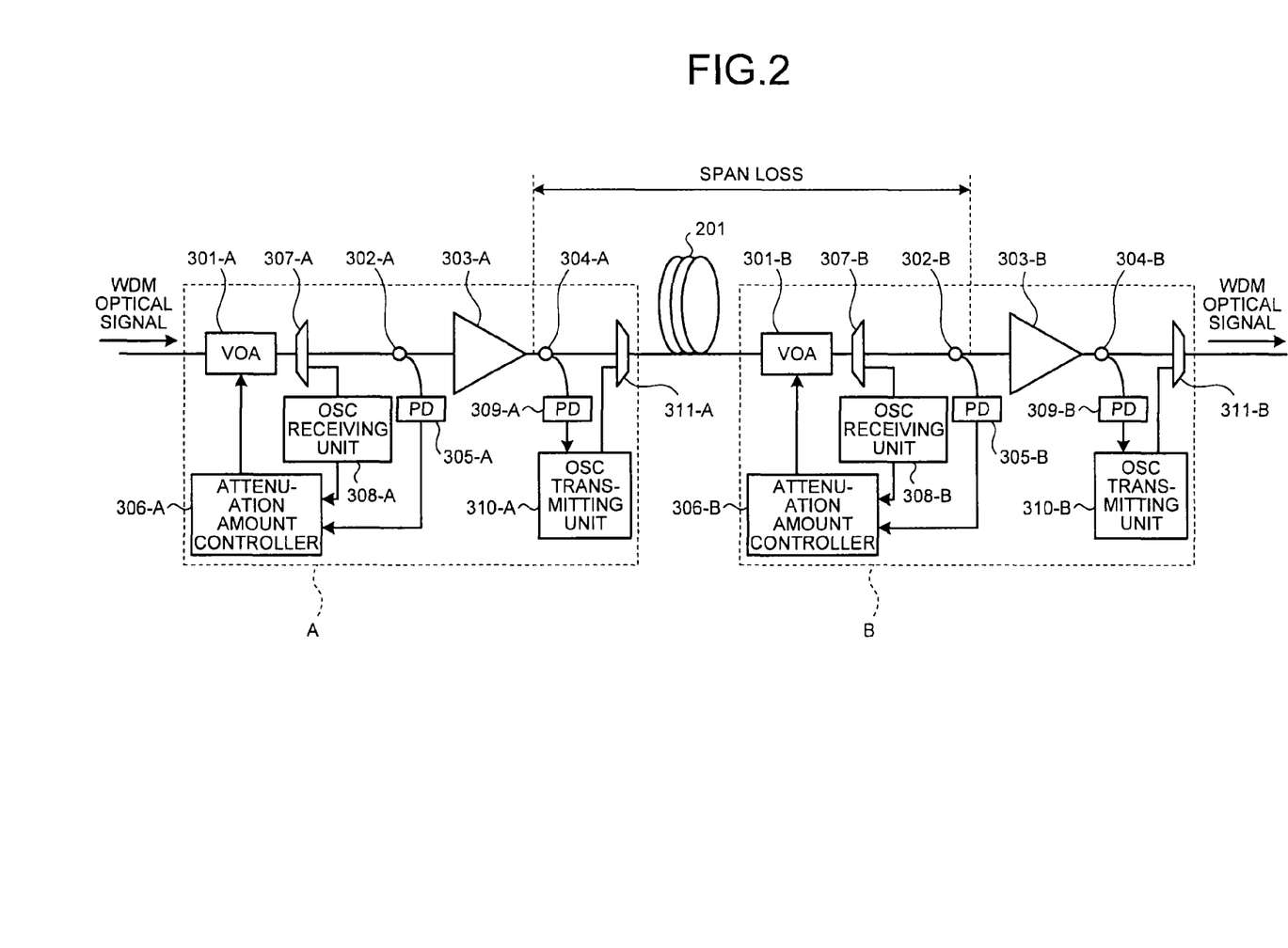
FIG. 2 depicts an explanatory diagram of a configuration and operations of two arbitrary adjacent repeaters in the optical transmission system according to the first embodiment.

FIG. 2 depicts an explanatory diagram of a configuration and operations of two arbitrary adjacent repeaters 3 in the optical transmission system shown in FIG. 1. In FIG. 2, a repeater at an upstream side (a WDM-signal optical transmitter 1 side) of an optical transmission direction is indicated as a repeater A, and a repeater at a downstream side (a WDM-signal optical receiver 4 side) of the optical transmission direction is indicated as a repeater B. An optical transmission direction explained in FIG. 2 is a direction from the repeater A to the repeater B.

As shown in FIG. 2, the repeater A includes a variable optical attenuator (VOA) 301-A, an input-level-detection optical coupler 302-A, an optical amplifier 303-A, an output-level-detection optical coupler 304-A, an input-level-detection photon detector (PD: Photo Diode, light receiving element) 305-A, an attenuation amount controller 306-A, a wavelength demultiplexing unit 307-A, an optical supervisory channel (OSC) receiving unit 308-A, an output-level-detection photon detector (PD) 309-A, an OSC transmitting unit 310-A, and an OSC-transmission optical multiplexing unit 311-A.

As shown in FIG. 2, the repeater B includes a variable optical attenuator (VOA) 301-B, an input-level-detection optical coupler 302-B, an optical amplifier 303-B, an output-level-detection optical coupler 304-B, an input-level-detection photon detector (PD) 305-B, an attenuation amount controller 306-B, a wavelength demultiplexing unit 307-B, an OSC receiving unit 308-B, an output-level-detection photon detector (PD) 309-B, an OSC transmitting unit 310-B, and an OSC-transmission optical multiplexing unit 311-B.

The VOA 301-A(B) collectively attenuates a WDM optical signal input from the repeater provided at an upstream of the own repeater A(B). The input-level-detection optical coupler 302-A(B) branches a part of the WDM optical signal from the wavelength demultiplexing unit 307-A(B), to the PD 305-A (B). The optical amplifier 303-A(B) collectively amplifies the input WDM optical signal with a predetermined amplification gain. The output-level-detection optical coupler 304-A (B) branches a part of the WDM optical signal from the optical amplifier 303-A(B), to the PD 309-A(B).

The PD 305-A(B) receives the part of the WDM optical signal from the input-level-detection optical coupler 302-A (B), detects an input level of the WDM optical signal input to the repeater A(B), and inputs a result of detection to the attenuation amount controller 306-A(B) as repeater-A(B)'s input-level detection information, which is information of the input level in the repeater A(B). The attenuation amount controller 306-A(B) calculates an attenuation amount of a WDM optical signal (including an OSC) in the VOA 301-A (B) such that a ratio of an output level of the WDM optical signal in the repeater at an upstream of the own repeater A(B) to an input level of the WDM optical signal to the optical amplifier 303-A(B) in the own repeater A(B) becomes a predetermined value, and controls attenuation of the WDM optical signal in the VOA 301-A(B).

The wavelength demultiplexing unit 307-A(B) demultiplexes the WDM optical signal, which contains an OSC output from the VOA 301-A(B), into the OSC and WDM optical signal. The OSC receiving unit 308-A(B) receives the OSC from the wavelength demultiplexing unit 307-A(B), obtains information of an output level of the WDM optical signal in the repeater at an upstream of the repeater A(B) from the OSC, and inputs information of an output level to the attenuation amount controller 306-A(B).

The PD 309-A(B) receives the part of the WDM optical signal from the output-level-detection optical coupler 304-A (B), detects an output level of the WDM optical signal in the optical amplifier 303-A(B), and inputs a result of detection to the OSC transmitting unit 310-A(B) as repeater-A(B)'s output-level detection signal, which is information of an output level of the WDM optical signal from the repeater A(B). The OSC transmitting unit 310-A(B) generates an OSC, which contains the repeater-A(B)'s output-level detection signal, and outputs this information to the OSC-transmission optical multiplexing unit 311-A(B).

The OSC-transmission optical multiplexing unit 311-A(B) receives an OSC from the OSC transmitting unit 310-A(B), multiplexes this OSC with a WDM optical signal from the optical coupler 304-A(B), and transmits the WDM optical signal containing the OSC to the repeater B (a device at a downstream side) through a transmission-path optical fiber 201.

In the repeater A, the optical coupler 302-A and the PD 305-A form an input level detector; the VOA 301-A forms a variable optical attenuating unit; the optical amplifier 303-A forms an optical amplifying unit; the output-level-detection optical coupler 304-A and the PD 309-A form an output level detector; and the wavelength demultiplexing unit 307-A, the OSC receiving unit 308-A, the OSC transmitting unit 310-A, and the OSC-transmission optical multiplexing unit 311-A form an output-level transmitting unit.

In the repeater B, the input-level-detection optical coupler 302-B and the PD 305-B form an input level detector; the VOA 301-B forms a variable optical attenuating unit; the optical amplifier 303-B forms an optical amplifying unit; the output-level-detection optical coupler 304-B and the PD 309-B form an output level detector; and the wavelength demultiplexing unit 307-B, the OSC receiving unit 308-B, the OSC transmitting unit 310-B, and the OSC-transmission optical multiplexing unit 311-B form an output-level transmitting unit.

The transmission-path optical fiber 201 forms a transmitting unit between the repeater A and the repeater B.

Between the repeater A and the repeater B, there is formed an output-level transmitting unit between the repeater A and the repeater B. The output-level transmitting unit includes the OSC transmitting unit 310-A, the OSC transmitting unit 311-A, the transmission-path optical fiber 201, the wavelength demultiplexing unit 307-B, and the OSC receiving unit 308-B.

Operations of the repeater A and the repeater B are explained next. First, the WDM optical signal containing an OSC input to the repeater A are collectively attenuated by the VOA 301-A controlled by the following method. That is, the WDM optical signal containing the OSC input to the repeater A are first input to the VOA 301-A. The WDM optical signal containing the OSC output from the VOA 301-A are demultiplexed into the OSC and the WDM optical signal by the wavelength demultiplexing unit 307-A. The demultiplexed OSC is input to the OSC receiving unit 308-A. The demultiplexed WDM optical signal is input to the input-level-detection optical coupler 302-A.

The OSC receiving unit 308-A receives the OSC from the wavelength demultiplexing unit 307-A, obtains information of an output level of the WDM optical signal in the repeater at an upstream of the repeater A from the OSC, and inputs the information of an output level to the attenuation amount controller 306-A. The input-level-detection optical coupler 302-A branches a part of the WDM optical signal from the wavelength demultiplexing unit 307-A, to the PD 305-A, and inputs the remaining WDM optical signal to the optical amplifier 303-A.

Upon receiving the part of the WDM optical signal from the input-level-detection optical coupler 302-A, the PD 305-A detects an input level of the WDM optical signal to the repeater A, and inputs a result of detection to the attenuation amount controller 306-A as repeater-A's input-level detection information.

The attenuation amount controller 306-A calculates an attenuation amount of the WDM optical signal containing an OSC in the VOA 301-A such that a ratio of an output level of the WDM optical signal in the repeater at an upstream of the repeater A to an input level of the WDM optical signal to the optical amplifier 303-A in the repeater A becomes a predetermined value, and the attenuation amount controller 306-A controls attenuation of the WDM optical signal in the VOA 301-A. In this case, the attenuation amount controller 306-A controls attenuation of the WDM optical signal containing an OSC in the VOA 301-A by designating "attenuation amount of WDM optical signal: Xdb", for example. The VOA 301-A collectively attenuates the WDM optical signal containing the OSC at a predetermined attenuation amount by the control of the attenuation amount controller 306-A, and outputs the attenuated WDM optical signal to the wavelength demultiplexing unit 307-A.

An operation between the repeater A and the repeater B, particularly, an operation between the optical amplifier 303-A and the optical amplifier 303-B, is explained next. The WDM optical signal (not containing any OSC), which are attenuated with a predetermined attenuation amount by the VOA 301-A in the repeater A and the signal level of which is controlled, are input to the optical amplifier 303-A via the wavelength demultiplexing unit 307-A and the input-level-detection optical coupler 302-A. Then, the WDM optical signal is collectively amplified by the optical amplifier 303-A at a predetermined fixed magnification ratio.

The collectively amplified WDM optical signal is input to the optical coupler 304-A. The output-level-detection optical coupler 304-A branches a part of the collectively amplified WDM optical signal to the PD 309-A, and inputs the remaining WDM optical signal to the OSC-transmission optical multiplexing unit 311-A.

Upon receiving the part of the WDM optical signal from the output-level-detection optical coupler 304-A, the PD 309-A detects an output level of the WDM optical signal in the optical amplifier 303-A (that is, an output level of the WDM optical signal in the repeater A), and inputs a result of detection to the OSC transmitting unit 310-A as repeater-A's output-level detection information. The OSC transmitting unit 310-A generates and outputs an OSC containing this repeater-A's output-level detection information to the OSC-transmission optical multiplexing unit 311-A.

Upon receiving the OSC from the OSC transmitting unit 310-A, the OSC-transmission optical multiplexing unit 311-A multiplexes this OSC with the WDM optical signal from the output-level-detection optical coupler 304-A, and outputs the WDM optical signal containing the OSC to the repeater B through the transmission-path optical fiber 201.

In this way, the WDM optical signal containing the OSC is transmitted to the repeater B through the transmission-path optical fiber 201. There occurs a transmission loss at this time. That is, a span loss is generated in the WDM optical signal during a period from when the WDM optical signal is amplified by the optical amplifier 303-A and input to the repeater B until when the WDM optical signal is input to the optical amplifier 303-B.

The WDM optical signal containing the OSC input to the repeater B is collectively attenuated by the VOA 301-B controlled by the following method. That is, the WDM optical signal containing the OSC input to the repeater B is first input to the VOA 301-B. The WDM optical signal containing the OSC output from the VOA 301-B is demultiplexed into the OSC and the WDM optical signal by the wavelength demultiplexing unit 307-B. The demultiplexed OSC is input to the OSC receiving unit 308-B.

The demultiplexed WDM optical signal is input to the input-level-detection optical coupler 302-B.

Upon receiving the OSC from the wavelength demultiplexing unit 307-B, the OSC receiving unit 308-B obtains information of an output level of the WDM optical signal in the repeater A from the OSC, and inputs the information to the attenuation amount controller 306-B. The input-level-detection optical coupler 302-B branches a part of the WDM optical signal from the wavelength demultiplexing unit 307-B, to the PD 305-B, and inputs the remaining WDM optical signal to the optical amplifier 303-B.

Upon receiving the part of the WDM optical signal from the input-level-detection optical coupler 302-B, the PD 305-B detects an input level of the WDM optical signal in the repeater B, and inputs a result of detection to the attenuation amount controller 306-B as repeater-B's input-level detection information.

The attenuation amount controller 306-B calculates an attenuation amount of the WDM optical signal in the VOA 301-B such that a ratio of an output level of the WDM optical signal in the repeater A to an input level of the WDM optical signal to the optical amplifier 303-B in the repeater B becomes a predetermined value, and controls attenuation of the WDM optical signal in the VOA 301-B. The VOA 301-B collectively attenuates the WDM optical signal at a predetermined attenuation amount by the control of the attenuation amount controller 306-B, and outputs the attenuated WDM optical signal.

The WDM optical signal (not containing any OSC), which is collectively attenuated by the VOA 301-B in the repeater B, is input to the optical amplifier 303-B via the wavelength demultiplexing unit 307-B and the input-level-detection optical coupler 302-B. Then, the WDM optical signal is collectively amplified by the optical amplifier 303-B.

The collectively amplified WDM optical signal is input to the output-level-detection optical coupler 304-B. The output-level-detection optical coupler 304-B branches a part of the collectively amplified WDM optical signal to the PD 309-B, and inputs the remaining WDM optical signal to the OSC-transmission optical multiplexing unit 311-B.

Upon receiving the part of the WDM optical signal from the output-level-detection optical coupler 304-B, the PD 309-B detects an output level of the WDM optical signal in the optical amplifier 303-B (that is, an output level of the WDM optical signal in the repeater B), and inputs a result of detection to the OSC transmitting unit 310-B as repeater-B's output-level detection information. The OSC transmitting unit 310-B generates and outputs an OSC containing this repeater-B's output-level detection information to the OSC-transmission optical multiplexing unit 311-B.

Upon receiving the OSC from the OSC transmitting unit 310-B, the OSC-transmission optical multiplexing unit 311-B multiplexes this OSC with the WDM optical signal from the output-level-detection optical coupler 304-B, and outputs the WDM optical signal containing the OSC to the repeater at a further downstream side. The above operation is performed between all other adjacent repeaters.

In the present invention, a state that the number of wavelengths of the WDM optical signal dynamically changes is not assumed. Instead, there is assumed a mild change such as a seasonal change. For example, as it is assumed that a span loss in FIG. 2 becomes larger than that in ordinary times in a summer season, an input level of the WDM optical signal to the repeater B becomes smaller than that in ordinary times. Therefore, an attenuation amount in the VOA 301-B needs to be set smaller than that in ordinary times. In this case, because a target signal level of the WDM optical signal is different depending on the number of wavelengths of the WDM optical signal, it is difficult to determine an attenuation amount without wavelength number information.

In the optical transmission system according to the present embodiment, as described above, a target signal level of the WDM optical signal can be determined by controlling an attenuation amount of the WDM optical signal in the VOA 301-B such that a ratio of an output level of the WDM optical signal in the repeater A to an input level of the WDM optical signal to the optical amplifier 303-B in the repeater B becomes constant. With this, a signal optical level per one wavelength can be held constant without wavelength number information.

In the embodiment described above, the wavelength demultiplexing unit 307-A is arranged next to (a downstream side of) the VOA 301-A. Alternatively, the wavelength demultiplexing unit 307-A can be arranged at the front of (an upstream side of) the VOA 301-A. Similarly, in the embodiment described above, the wavelength demultiplexing unit 307-B is arranged next to (a downstream side of) the VOA 301-B. Alternatively, the wavelength demultiplexing unit 307-B can be arranged at the front of (an upstream side of) the VOA 301-B. That is, the OSC reception can be performed at the front of (an upstream side of) the VOA.

The following descriptions also apply to second and third embodiments described later, and thus the descriptions will be omitted in the second and third embodiments.

In the embodiment described above, an erbium-doped optical-fiber amplifier can be used in the optical amplifier 303-A and the optical amplifier 303-B.

In the embodiment described above, because an input level of a WDM optical signal to the optical amplifier 303-B is controlled such that a ratio of an output level of a WDM optical signal in the repeater A to an input level of a WDM optical signal to the optical amplifier 303-B in the repeater B becomes constant. Thus, the input level of a WDM optical signal to the optical amplifier 303-B in the repeater B cannot be controlled without the output level information of the repeater A. Therefore, preferably, an exceptional process is prepared in advance for a case where the output level information of a WDM optical signal in the repeater A is not transmitted to the repeater B.

First, at an activating time of an optical transmission system, the attenuation amount controller 306-B does not control the VOA 301-B until when information of an output level of a WDM optical signal in the repeater A is transmitted. That is, the OSC receiving unit 308-B does not control the VOA 301-B until when receiving the information of an output level of the WDM optical signal in the repeater A.

When transmission of the information of an output level of the WDM optical signal in the repeater A is interrupted by a certain block after the optical transmission system is activated, the attenuation amount controller 306-B determines that a value of an output level of the WDM optical signal in the repeater A received immediately before is kept as it is, and calculates an attenuation amount of a signal level of a WDM optical signal in the VOA 301-B based on this value.

In the embodiment described above, the input level detector of the repeater A is configured with the input-level-detection optical coupler 302-A and the PD 305-A. The input level detector of the repeater A can have any configuration, as far as it includes a function of a branching unit, which branches a part of the WDM optical signal input to the repeater A, and a function of a detecting unit, which detects a level of the WDM optical signal branched by the branching unit.

In the embodiment described above, the output level detector of the repeater A is configured by the output-level-detection optical coupler 304-A and the PD 309-A. The output level detector of the repeater A can have any configuration, as far as it includes a function of a branching unit, which branches a part of the WDM optical signal (the WDM optical signal output from the repeater A) collectively amplified by the optical amplifier 303-A, and a function of a detecting unit, which detects a level of the WDM optical signal branched by the branching unit.

In the embodiment described above, the input level detector of the repeater B is configured with the input-level-detection optical coupler 302-B and the PD 305-B. The input level detector of the repeater B can have any configuration, as far as it includes a function of a branching unit, which branches a part of the WDM optical signal input to the repeater B, and a function of a detecting unit, which detects a level of the WDM optical signal branched by the branching unit.

In the embodiment described above, the output level detector of the repeater B is configured with the output-level-detection optical coupler 304-B and the PD 309-B. The output level detector of the repeater B can have any configuration, as far as it includes a function of a branching unit, which branches a part of the WDM optical signal (the WDM optical signal output from the repeater A) collectively amplified by the optical amplifier 303-B, and a function of a detecting unit, which detects a level of the WDM optical signal branched by the branching unit.

In the embodiment described above, the VOA 301-A collectively attenuates the level of the WDM signal beam levels input to the repeater A. A device having any configuration can be used, as far as it can collectively control the level of the WDM optical signal input to the repeater A.

In the embodiment described above, although the VOA 301-B collectively attenuates the level of the WDM signal beam input to the repeater B, a device having any configuration can be used, as far as it can collectively control the level of the WDM optical signal input to the repeater B.

In the embodiment described above, the repeater A and the repeater B shown in FIG. 2 are explained as examples of certain adjacent repeaters in the optical transmission system that has two or more repeaters regardless of adjacent or not adjacent. The present invention can be applied as far as an optical transmission system has two or more repeaters, which includes an upstream repeater A and a downstream repeater B, and also the system has an output-level detecting unit of the repeater A, a transmitting unit between the repeater A and the repeater B, an output-level control unit of the repeater A, and a variable optical attenuating unit of the repeater B.

Second Embodiment

Figure 3:
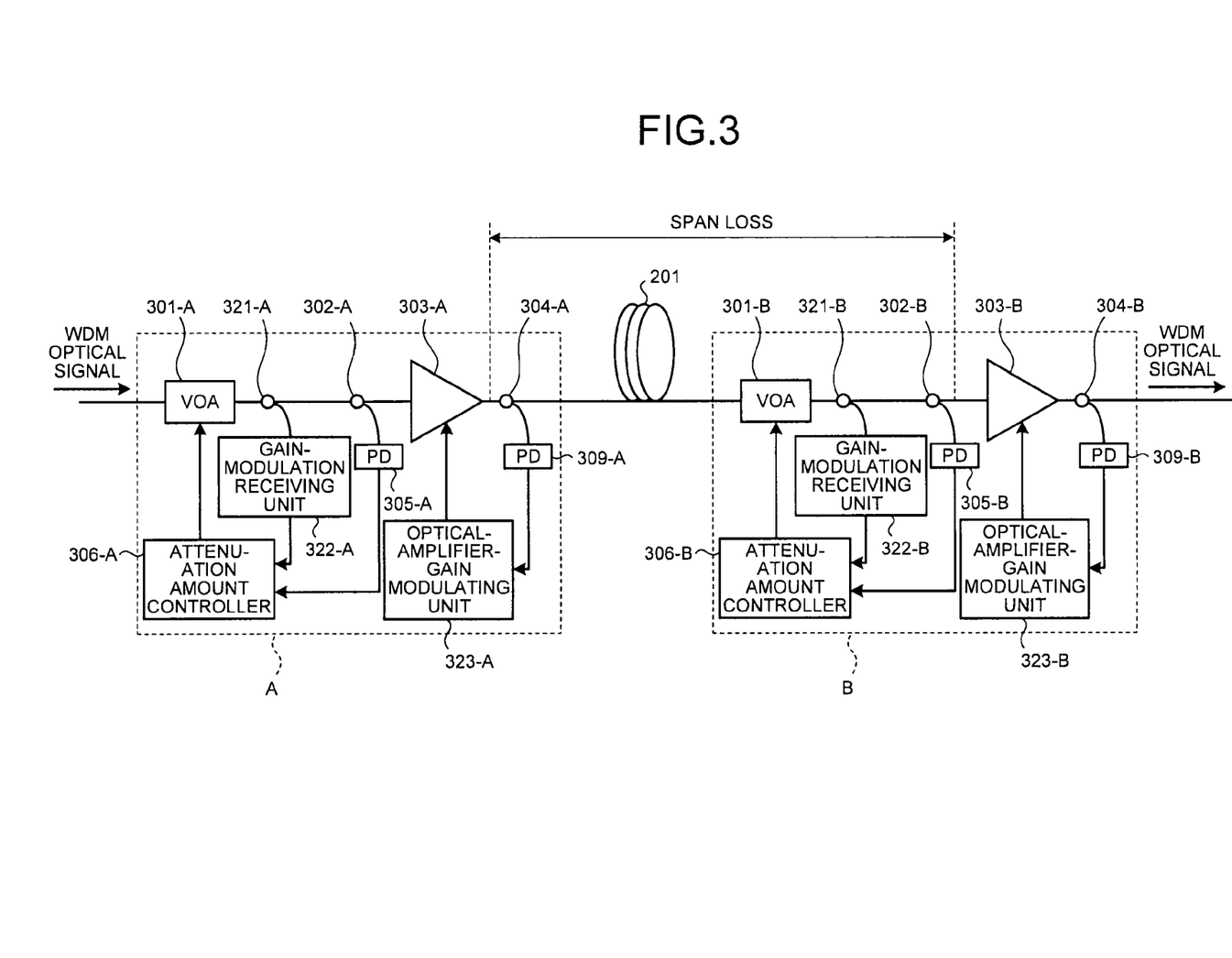
FIG. 3 depicts an explanatory diagram of a configuration and operations of two arbitrary adjacent repeaters in an optical transmission system according to a second embodiment of the present invention.

FIG. 3 depicts an explanatory diagram of a configuration and operations of two arbitrary adjacent repeaters in an optical transmission system according to the second embodiment. In FIG. 3, like in the first embodiment, a repeater at an upstream side (at a WDM-signal optical transmitter 1 side) is indicated as the repeater A, and a repeater at a downstream side (at a WDM-signal optical receiver 4 side) is indicated as the repeater B. Components common to those in the first embodiment are denoted by reference letters or numerals common to those in FIG. 2, and explanations thereof will be omitted. Because the configuration of the optical transmission system according to the second embodiment is identical to that in the first embodiment, reference is made to FIG. 1 as for the configuration and explanations thereof will be omitted.

As shown in FIG. 3, the repeater A includes the VOA 301-A, the input-level-detection optical coupler 302-A, the optical amplifier 303-A, the output-level-detection optical coupler 304-A, the PD 305-A, the attenuation amount controller 306-A, the PD 309-A, a gain-modulation-detection optical coupler 321-A, a gain-modulation receiving unit 322-A, and an optical-amplifier-gain modulating unit 323-A.

As shown in FIG. 3, the repeater B includes the VOA 301-B, the input-level-detection optical coupler 302-B, the optical amplifier 303-B, the output-level-detection optical coupler 304-B, the PD 305-B, the attenuation amount controller 306-B, the PD 309-B, a gain-modulation-detection optical coupler 321-B, a gain-modulation receiving unit 322-B, and an optical-amplifier-gain modulating unit 323-B.

The gain-modulation-detection optical coupler 321-A(B) branches a part of a WDM optical signal output from the VOA 301-A(B), to the gain-modulation receiving unit 322-A(B). The gain-modulation receiving unit 322-A(B) receives the WDM optical signal from the gain-modulation-detection optical coupler 321-A(B), thereby receiving modulation information of an amplification gain of the WDM optical signal. As a result, the gain-modulation receiving unit 322-A(B) obtains information of an output level of the WDM optical signal in the repeater at an upstream of the repeater A(B), and inputs the information of an output level to the attenuation amount controller 306-A(B). The optical-amplifier-gain modulating unit 323-A(B) modulates the amplification gain of the optical amplifier 303-A(B) according to repeater-A(B)'s output-level detection information, and modulates the WDM optical signal.

Between the repeater A and the repeater B, an output-level transmitting unit between the repeater A and the repeater B is configured with the optical-amplifier-gain modulating unit 323-A, the optical amplifier 303-A, the transmission-path optical fiber 201, the gain-modulation-detection optical coupler 321-B, and the gain-modulation receiving unit 322-B.

Operations of the repeater A and the repeater B according to the present embodiment are explained next, mainly based on an operation between the repeater A and the repeater B. The input level detector (the input-level-detection optical coupler 302-A and the PD 305-A, the input-level-detection optical coupler 302-B and the PD 305-B), the amplifying unit (the optical amplifier 303-A, the optical amplifier 303-B), the output level detector (the output-level-detection optical coupler 304-A and the PD 309-A, the output-level-detection optical coupler 304-B and the PD 309-B), and the transmitting unit (the transmission-path optical fiber 201) are the same as those in the first embodiment, and therefore detailed explanations thereof will be omitted.

The WDM optical signal collectively amplified by the optical amplifier 303-A in the repeater A is input to the output-level-detection optical coupler 304-A. The output-level-detection optical coupler 304-A branches a part of the collectively amplified WDM optical signal to the PD 309-A.

The PD 309-A receives the part of the WDM optical signal from the output-level-detection optical coupler 304-A, detects an output level of the WDM optical signal in the optical amplifier 303-A (that is, an output level of the WDM optical signal in the repeater A), and inputs a result of detection to the optical-amplifier-gain modulating unit 323-A as repeater-A's output-level detection information. The optical-amplifier-gain modulating unit 323-A modulates an amplification gain of the optical amplifier 303-A according to repeater-A's output-level detection information, and controls to modulate the WDM optical signal. That is, the optical-amplifier-gain modulating unit 323-A modulates a part of the amplification gain of the optical amplifier 303-A. For example, assuming the amplification gain is cyclically changed, the optical-amplifier-gain modulating unit 323-A performs modulation such that the width (amplitude) between a maximum value and a minimum value of a gain or a cycle of a gain change is to be changed.

The optical-amplifier-gain modulating unit 323-A holds correspondence information (gain-modulation-pattern correspondence information) between an output level of the WDM optical signal in the repeater A and a modulation pattern (a modulation pattern of amplitude and cycle) of the amplification gain, which is to be modulated corresponding to this output level. The optical-amplifier-gain modulating unit 323-A modulates the amplification gain of the optical amplifier 303-A based on the gain-modulation-pattern correspondence information and the repeater-A's output-level detection information. That is, the optical-amplifier-gain modulating unit 323-A can incorporate the information of an output level of a WDM optical signal in the repeater A into the WDM optical signal as modulation information of an amplification gain (a modulation pattern of an amplification gain).

The gain-modulation receiving unit 322-B in the repeater 3 also holds the gain-modulation-pattern correspondence information. The gain-modulation receiving unit 322-B can obtain information of an output level of the WDM optical signal in the repeater A by using the modulation information of an amplification gain (a modulation pattern of an amplification gain) incorporated in the input WDM optical signal and the gain-modulation-pattern correspondence information. That is, the gain-modulation receiving unit 322-B can convert the modulation information of amplification gain (a modulation pattern of an amplification gain) incorporated in the input WDM optical signal into the information of an output level of WDM optical signal in the repeater A.

The optical amplifier 303-A transmits the WDM optical signal obtained by having the amplification gain modulated according to the control of the optical-amplifier-gain modulating unit 323-A to the repeater B through the transmission-path optical fiber 201. The WDM optical signal transmitted to the repeater B through the transmission-path optical fiber 201 is input to the VOA 301-B first. A part of the WDM optical signal output from the VOA 301-B is branched to the gain-modulation receiving unit 322-B by the gain-modulation-detection optical coupler 321-B, and the remaining WDM optical signal is input to the input-level-detection optical coupler 302-B.

The gain-modulation receiving unit 322-B receives the WDM optical signal from the gain-modulation-detection optical coupler 321-B, thereby receiving modulation information of an amplification gain of a WDM optical signal. As a result, the gain-modulation receiving unit 322-B obtains information of an output level of the WDM optical signal in the repeater A from the modulation information of the amplification gain, and inputs the information of an output level to the attenuation amount controller 306-B.

As described above, the gain-modulation receiving unit 322-B has gain-modulation-pattern correspondence information in a similar manner to that of the optical-amplifier-gain modulating unit 323-A. Accordingly, the gain-modulation receiving unit 322-B can convert modulation information of an amplification gain (a modulation pattern of an amplification gain) incorporated in the input WDM optical signal into information of an output level of the WDM optical signal in the repeater A by using the gain-modulation-pattern correspondence information.

The input-level-detection optical coupler 302-B branches a part of the WDM optical signal from the gain-modulation-detection optical coupler 321-B, inputs the branched part of the WDM optical signal to the PD 305-B, and inputs the remaining WDM optical signal to the optical amplifier 303-B. Upon receiving the part of the WDM optical signal from the input-level-detection optical coupler 302-B, the PD 305-B detects an input level of the WDM optical signal in the repeater B, and inputs a result of detection to the attenuation amount controller 306-B as the repeater-B's input-level detection information.

The attenuation amount controller 306-B calculates an attenuation amount of the WDM optical signal in the VOA 301-B such that a ratio of an output level of the WDM optical signal in the repeater A to an input level of the WDM optical signal to the optical amplifier 303-B in the repeater B becomes a predetermined value, and controls attenuation of the WDM optical signal in the VOA 301-B. The VOA 301-B collectively attenuates the WDM optical signal at a predetermined attenuation amount according to the control of the attenuation amount controller 306-B, and outputs the attenuated WDM optical signal. The above operation is performed between all other adjacent repeaters.

The WDM optical signal which are attenuated by the VOA 301-B in the repeater B and the signal level of which is controlled, are input to the optical amplifier 303-B via the gain-modulation-detection optical coupler 321-B, and the input-level-detection optical coupler 302-B. Thereafter, an operation similar to that of the optical amplifier 303-A afterward explained above is performed.

Operations of components not explained in FIG. 3 are explained next. The WDM optical signal is input to the repeater A from a repeater at an upstream side, and are collectively attenuated by the VOA 301-A controlled by the following method. That is, the WDM optical signal input to the repeater A is input to the VOA 301-A first. A part of the WDM optical signal output from the VOA 301-A is branched and input to the gain-modulation receiving unit 322-A by the gain-modulation-detection optical coupler 321-A, and the remaining WDM optical signal is input to the input-level-detection optical coupler 302-A.

The gain-modulation receiving unit 322-A receives the WDM optical signal from the gain-modulation-detection optical coupler 321-A, obtains information of an output level of the WDM optical signal in the repeater at an upstream of the repeater A, and inputs the information to the attenuation amount controller 306-A. The input-level-detection optical coupler 302-A branches a part of the WDM optical signal from the gain-modulation-detection optical coupler 321-A, inputs the branched part of the WDM optical signal to the PD 305-A, and inputs the remaining WDM optical signal to the optical amplifier 303-A.

The above operation is identical to the operation when the repeater A inputs the WDM optical signal to the repeater B explained above.

Preferably, a modulation spectrum of an amplification gain of the optical-amplifier-gain modulating unit 323-A and the optical-amplifier-gain modulating unit 323-B is at outside of a low-frequency side of a WDM optical signal band. Assuming a transmission speed per one wavelength of the WDM optical signal is 10 Gbit/s, an optical-amplifier amplification-gain modulation speed 100 kilohertz of the optical-amplifier-gain modulating units 323-A and 323-B is sufficiently low, and a modulation spectrum of the amplification gain is at outside of a low frequency side of the WDM optical signal band.

Preferably, an averaging time to detect an input level in the PD 309-A and the PD 309-B is about ten times to 100 times of a cycle of an optical-amplifier amplification-gain modulation to avoid receiving influence of the gain modulation in the optical amplifier. When an optical-amplifier amplification-gain modulation speed is 100 kilohertz, it suffices that an averaged level within 1 millisecond is detected, for example.

In the embodiment described above, the gain-modulation-detection optical coupler 321-A is arranged next to (a downstream side of) the VOA 301-A. Alternatively, the gain-modulation-detection optical coupler 321-A can be set at the front of (an upstream side of) the VOA 301-A. Similarly, in the embodiment described above, the gain-modulation-detection optical coupler 321-B is arranged next to (a downstream side of) the VOA 301-B. Alternatively, the gain-modulation-detection optical coupler 321-B can be set at the front of (an upstream side of) the VOA 301-B. That is, amplification gain modulation can be received at the front of (an upstream side of) each VOA.

In the present invention, a state that the number of wavelengths of the WDM optical signal dynamically changes is not assumed. Instead, there is assumed a mild change such as a seasonal change. For example, as it is assumed that a span loss in FIG. 3 becomes larger than that in ordinary times in a summer season, an input level of the WDM optical signal to the repeater B becomes smaller than that in ordinary times. Therefore, an attenuation amount in the VOA 301-B needs to be set smaller than that in ordinary times. In this case, because a target signal level of the WDM optical signal is different depending on the number of wavelengths of the WDM optical signal, it is difficult to determine an attenuation amount without wavelength number information.

In the optical transmission system according to the present embodiment, as described above, a target signal level of the WDM optical signal can be determined by controlling an attenuation amount of the WDM optical signal in the VOA 301-B such that a ratio of an output level of the WDM optical signal in the repeater A to an input level of the WDM optical signal to the optical amplifier 303-B in the repeater B becomes constant. Thus, a signal optical level per one wavelength can be held constant without wavelength number information.

Third Embodiment

Figure 4:
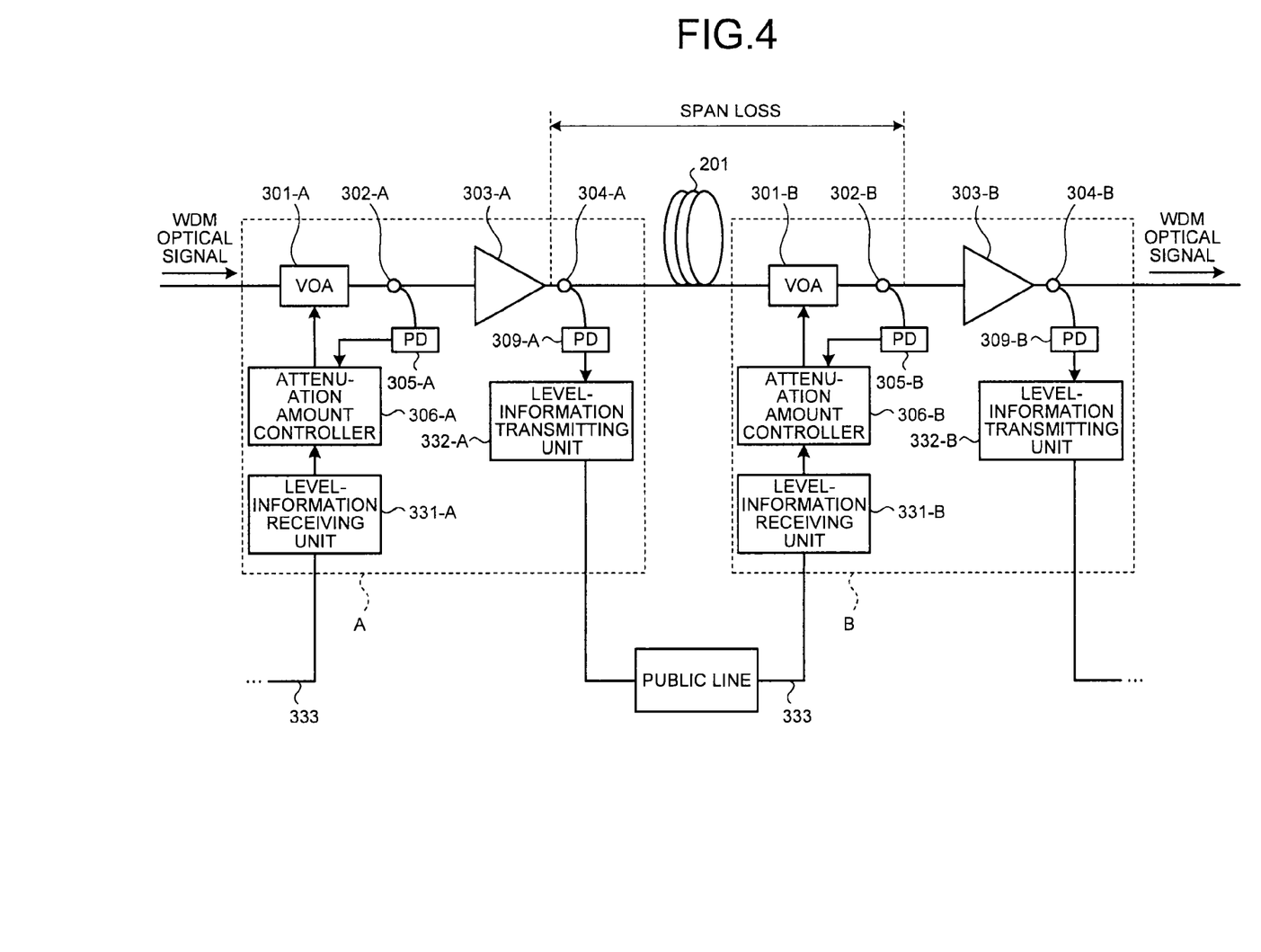
FIG. 4 depicts an explanatory diagram of a configuration and operations of two arbitrary adjacent repeaters in an optical transmission system according to a third embodiment of the present invention.

FIG. 4 depicts an explanatory diagram of a configuration and operations of two arbitrary adjacent repeaters in an optical transmission system according to the third embodiment. In FIG. 4, like in the first embodiment, a repeater at an upstream side (a WDM-signal optical transmitter 1 side) is indicated as the repeater A, and a repeater at a downstream side (a WDM-signal optical receiver 4 side) is indicated as the repeater B. Components common to those in the first embodiment are denoted by reference letters or numerals common to those in FIG. 2, and explanations thereof will be omitted. Because the configuration of the optical transmission system according to the third embodiment is identical to that in the first embodiment, reference is made to FIG. 1 as for the configuration and explanations thereof will be omitted.

As shown in FIG. 4, the repeater A includes the VOA 301-A, the input-level-detection optical coupler 302-A, the optical amplifier 303-A, the output-level-detection optical coupler 304-A, the PD 305-A, the attenuation amount controller 306-A, the PD 309-A, a level-information receiving unit 331-A, and a level-information transmitting unit 332-A.

As shown in FIG. 4, the repeater B includes the VOA 301-B, the input-level-detection optical coupler 302-B, the optical amplifier 303-B, the output-level-detection optical coupler 304-B, the PD 305-B, the attenuation amount controller 306-B, the PD 309-B, a level-information receiving unit 331-B, and a level-information transmitting unit 332-B.

The level-information receiving unit 331-A(B) receives output-level detection information of the WDM optical signal in a repeater at an upstream of the repeater A(B), and inputs the output-level detection information to the attenuation amount controller 306-A(B). The level-information transmitting unit 332-A(B) transmits repeater-A(B)'s output-level detection information to the repeater B (a repeater at a downstream side) through a public line 333.

The level-information transmitting unit 332-A in the repeater A and the level-information receiving unit 331-B in the repeater B are connected to each other via the public line 333. Between the repeater A and the repeater B, an output-level transmitting unit between the repeater A and the repeater B is configured by the level-information transmitting unit 332-A, the public line 333, and the level-information receiving unit 331-B.

Operations of the repeater A and the repeater B according to the present embodiment are explained next, mainly based on an operation between the repeater A and the repeater B. The input level detector (the input-level-detection optical coupler 302-A and the PD 305-A, the input-level-detection optical coupler 302-B and the PD 305-B), the amplifying unit (the optical amplifier 303-A, the optical amplifier 303-B), the output level detector (the output-level-detection optical coupler 304-A and the PD 309-A, the output-level-detection optical coupler 304-B and the PD 309-B), and the transmitting unit (the transmission-path optical fiber 201) are the same as those in the first embodiment, and therefore detailed explanations thereof will be omitted.

The WDM optical signal collectively amplified by the optical amplifier 303-A in the repeater A are input to the output-level-detection optical coupler 304-A. The output-level-detection optical coupler 304-A branches a part of the collectively amplified WDM optical signal to the PD 309-A.

Upon receiving the part of the WDM optical signal from the output-level-detection optical coupler 304-A, the PD 309-A detects an output level of the WDM optical signal in the optical amplifier 303-A (that is, an output level of the WDM optical signal in the repeater A), and inputs a result of detection to the level-information transmitting unit 332-A as repeater-A's output-level detection information. The level-information transmitting unit 332-A transmits the repeater-A's output-level detection information to the repeater B through the public line 333.

In the repeater B, the level-information receiving unit 331-B receives the repeater-A's output-level detection information through the public line 333, and inputs the repeater-A's output-level detection information to the attenuation amount controller 306-B.

The WDM optical signal transmitted from the output-level-detection optical coupler 304-A to the repeater B via the transmission-path optical fiber 201 are input to the VOA 301-B first. The input-level-detection optical coupler 302-B branches a part of the WDM optical signal output from the VOA 301-B to the PD 305-B, and inputs the remaining WDM optical signal to the optical amplifier 303-B.

Upon receiving the part of the WDM optical signal from the input-level-detection optical coupler 302-B, the PD 305-B detects an input level of the WDM optical signal in the repeater B, and inputs a result of detection to the attenuation amount controller 306-B as repeater-B's input-level detection information.

The attenuation amount controller 306-B calculates an attenuation amount of the WDM optical signal in the VOA 301-B such that a ratio of an output level of the WDM optical signal in the repeater A to an input level of the WDM optical signal to the optical amplifier 303-B in the repeater B becomes a predetermined value, and controls attenuation of the WDM optical signal in the VOA 301-B. The VOA 301-B collectively attenuates the WDM optical signal at a predetermined attenuation amount according to the control of the attenuation amount controller 306-B, and outputs the attenuated WDM optical signal. The above operation is performed between all other adjacent repeaters.

The WDM optical signal which are attenuated by the VOA 301-B in the repeater B and a signal level of which is controlled, are input to the optical amplifier 303-B via the inputlevel-detection optical coupler 302-B. Thereafter, operations identical to those of the optical amplifier 303-A afterward explained above are performed.

An operation of each constituent element not explained in FIG. 4 is explained next. The WDM optical signal is input to the repeater A from a repeater at an upstream side, and is collectively attenuated by the VOA 301-A controlled by the following method. That is, the WDM optical signal input to the repeater A is input to the VOA 301-A first. A part of the WDM optical signal output from the VOA 301-A is branched and input to the PD 305-A by the input-level-detection optical coupler 302-A, and the remaining WDM optical signal is input to the optical amplifier 303-A.

The PD 305-A receives the part of the WDM optical signal from the input-level-detection optical coupler 302-A, detects an input level of the WDM optical signal in the repeater A, and inputs a result of detection to the attenuation amount controller 306-A as repeater-A's input-level detection information.

The level-information receiving unit 331-A receives output-level detection information of the WDM optical signal in a repeater at an upstream side through the public line 333, and inputs the output-level detection information to the attenuation amount controller 306-A.

The attenuation amount controller 306-A calculates an attenuation amount of the WDM optical signal in the VOA 301-A such that a ratio of an output level of the WDM optical signal in a repeater at an upstream side to an input level of the WDM optical signal to the optical amplifier 303-A in the repeater A becomes a predetermined value, and controls attenuation of the WDM optical signal in the VOA 301-A. The VOA 301-A collectively attenuates the WDM optical signal at a predetermined attenuation amount by the control of the attenuation amount controller 306-A, and outputs the attenuated WDM optical signal.

Operations described above are identical to the above-explained operations when WDM optical signal has been inputted to the repeater B by the repeater A.

In the present invention, a state that the number of wavelengths of the WDM optical signal dynamically changes is not assumed. Instead, there is assumed a mild change such as a seasonal change. For example, as it is assumed that a span loss in FIG. 4 becomes larger than that in ordinary times in a summer season, an input level of the WDM optical signal to the repeater B becomes smaller than that in ordinary times. Therefore, an attenuation amount in the VOA 301-B needs to be set smaller than that in ordinary times. In this case, because a target signal level of the WDM optical signal is different depending on the number of wavelengths of the WDM optical signal, it is difficult to determine an attenuation amount without wavelength number information.

In the optical transmission system according to the present embodiment, as described above, a target signal level of the WDM optical signal can be determined by controlling an attenuation amount of WDM the optical signal in the VOA 301-B such that a ratio of an output level of the WDM optical signal in the repeater A to an input level of the WDM optical signal to the optical amplifier 303-B in the repeater B becomes constant. Thus, a signal optical level per one wavelength can be held constant without wavelength number information.

In the embodiment described above, information of an output level of the WDM optical signal in the repeater A at an upstream side is transmitted to the repeater B at a downstream side by using the level-information transmitting unit 332-A, the public line 333, and the level-information receiving unit 331-B. Any configuration can be used, as far as it has a function capable of transmitting such information between repeaters.

Industrial Applicability

As described above, the optical transmission system according to the present invention is useful when an optical signal is transmitted over a long distance by using an optical fiber in a wavelength-division-multiplexing optical transmission system.

The invention claimed is:
1. An optical transmission system comprising:
a transmitter that transmits a wavelength-division-multiplexed optical signal having a plurality of optical signals of different wavelengths multiplexed at an upstream side of an optical transmission direction;
a transmitting unit that transmits the wavelength-division-multiplexed optical signal transmitted by the transmitter;
a plurality of repeaters that amplifies the wavelength-division-multiplexed optical signal transmitted by the transmitting unit; and
a receiver that receives the wavelength-division-multiplexed optical signal transmitted by the transmitting unit via the repeaters at a downstream side of the optical transmission direction, wherein
each of the repeaters comprises:
a variable optical attenuating unit that collectively attenuates the wavelength-division-multiplexed optical signal input thereto from an upstream side;
an optical-attenuation adjusting unit that adjusts attenuation of a signal level of the wavelength-division-multiplexed optical signal in the variable optical attenuating unit; and
an optical amplifying unit that collectively amplifies the wavelength-division-multiplexed optical signal collectively attenuated by the variable optical attenuating unit, at a predetermined amplification gain, and outputs to a downstream side the wavelength-division-multiplexed optical signal collectively amplified, and
the optical-attenuation adjusting unit comprises:
an input level detector that detects a signal level of the wavelength-division-multiplexed optical signal collectively attenuated by the variable optical attenuating unit;
an output level detector that detects a signal level of the wavelength-division-multiplexed optical signal, which is amplified by the optical amplifying unit and output to a downstream side;
an output-level transmitting unit that receives information of a signal level of the wavelength-division-multiplexed optical signal from the output level detector and transmits information of the signal level of the wavelength-division-multiplexed optical signal detected by the output level detector to a repeater adjacent at a downstream side; and
an attenuation amount controller that controls the variable optical attenuating unit by calculating an attenuation amount of a signal level of the wavelength-division-multiplexed optical signal in the variable optical attenuating unit based on information of a signal level of the collectively attenuated wavelength-division-multiplexed optical signal detected by the input level detector and a signal level of the wavelength-division-multiplexed optical signal transmitted by the output-level transmitting unit of a repeater adjacent at an upstream side.

2. The optical transmission system according to claim 1, wherein,
at an activating time of the optical transmission system, the attenuation amount controller does not control the variable optical attenuating unit until when the output-level transmitting unit receives information of a signal level of the wavelength-division-multiplexed optical signal output by the repeater adjacent at the upstream side.

3. The optical transmission system according to claim 2, wherein
the attenuation amount controller calculates an attenuation amount of a signal level of the wavelength-division-multiplexed optical signal in the variable optical attenuating unit based on information of a signal level received immediately before the interruption, when transmission of information of a signal level of the wavelength-division-multiplexed optical signal output by the repeater adjacent at the upstream side is interrupted after the optical transmission system is activated.

4. The optical transmission system according to claim 1, wherein
the input level detector comprises:
a first branching unit that branches a part of the wavelength-division-multiplexed optical signal input thereto from the upstream side; and
a first photon detector that detects a signal level of the wavelength-division-multiplexed optical signal branched by the first branching unit, and
the output level detector comprises:
a second branching unit that branches a part of the wavelength-division-multiplexed optical signal amplified by the optical amplifying unit; and
a second photon detector that detects a signal level of the wavelength-division-multiplexed optical signal branched by the second branching unit.

5. The optical transmission system according to claim 4, wherein
the output-level transmitting unit comprises:
a transmitter that generates and transmits an optical supervisory channel signal containing information of the signal level detected by the second photon detector;
a multiplexing unit that multiplexes the optical supervisory channel signal from the transmitter with the wavelength-division-multiplexed optical signal amplified by the optical amplifying unit, and transmits a multiplexed signal to the repeater adjacent at the downstream side;
a demultiplexing unit that demultiplexes the optical supervisory channel signal from a wavelength-division-multiplexed optical signal, which is multiplexed with the optical supervisory channel signal and is output by a repeater adjacent at an upstream side; and
a receiver that obtains information of a signal level of the wavelength-division-multiplexed optical signal output by the repeater adjacent at the upstream side upon reception of the optical supervisory channel signal demultiplexed by the demultiplexing unit.

6. The optical transmission system according to claim 4, wherein
the output-level transmitting unit comprises:
a gain modulating unit that relates information of a signal level detected by the second photon detector to modulation information of the amplification gain of the optical amplifying unit;
a third branching unit that branches a part of the wavelength-division-multiplexed optical signal input from the repeater adjacent at the upstream side; and
a gain-modulation receiving unit that receives modulation information of the amplification gain of the wavelength-division-multiplexed optical signal branched by the third branching unit, and obtains information of a signal level detected by the second photon detector from information of modulation of the amplification gain.

7. The optical transmission system according to claim 6, wherein
a spectrum of modulation of the amplification gain is at outside of a low frequency side of a wavelength-division-multiplexed optical signal band.

8. The optical transmission system according to claim 6, wherein
the first photon detector averages in an input level within a cycle longer than a cycle of the modulated amplification gain.

9. The optical transmission system according to claim 4, wherein
the output-level transmitting unit comprises:
a level-information transmitting unit that transmits information of the signal level detected by the second photon detector to the repeater adjacent at the downstream side by a public line; and
a level-information receiving unit that receives information of the signal level transmitted from a level-information transmitting unit of the repeater adjacent at the upstream side via the public line.

10. A repeater in an optical transmission system comprising:
a transmitter that transmits a wavelength-division-multiplexed optical signal having a plurality of optical signals of different wavelengths multiplexed at an upstream side of an optical transmission direction;
a transmitting unit that transmits the wavelength-division-multiplexed optical signal transmitted by the transmitter;
a plurality of repeaters that amplifies the wavelength-division-multiplexed optical signal transmitted by the transmitting unit; and
a receiver that receives the wavelength-division-multiplexed optical signal transmitted by the transmitting unit via the repeaters at a downstream side of the optical transmission direction, wherein
the repeater comprises:
a variable optical attenuating unit that collectively attenuates the wavelength-division-multiplexed optical signal input thereto from an upstream side;
an optical-attenuation adjusting unit that adjusts attenuation of a signal level of the wavelength-division-multiplexed optical signal in the variable optical attenuating unit; and
an optical amplifying unit that collectively amplifies the wavelength-division-multiplexed optical signal collectively attenuated by the variable optical attenuating unit, at a predetermined amplification gain, and outputs to a downstream side the wavelength-division-multiplexed optical signal collectively amplified, and
the optical-attenuation adjusting unit comprises:
an input level detector that detects a signal level of the wavelength-division-multiplexed optical signal collectively attenuated by the variable optical attenuating unit;
an output level detector that detects a signal level of the wavelength-division-multiplexed optical signal, which is amplified by the optical amplifying unit and output to a downstream side;
an output-level transmitting unit that receives information of a signal level of the wavelength-division-multiplexed optical signal from the output level detector and transmits information of the signal level of the wavelength-division-multiplexed optical signal detected by the output level detector to a repeater adjacent at a downstream side; and an attenuation amount controller that controls the variable optical attenuating unit by calculating an attenuation amount of a signal level of the wavelength-division-multiplexed optical signal in the variable optical attenuating unit based on information of a signal level of the collectively attenuated wavelength-division-multiplexed optical signal detected by the input level detector and a signal level of the wavelength-division-multiplexed optical signal transmitted by the output-level transmitting unit of a repeater adjacent at an upstream side.

* * * * *